(12) United States Patent
Bauer et al.

(10) Patent No.: US 7,045,002 B2
(45) Date of Patent: May 16, 2006

(54) INTERACTIVE INK SET FOR INKJET PRINTING

(75) Inventors: Richard Douglas Bauer, Kennett Square, PA (US); Clarence Gaetano Hermansky, Wilmington, DE (US); William Thomas Hall, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 46 days.

(21) Appl. No.: 10/702,780

(22) Filed: Nov. 6, 2003

(65) Prior Publication Data

US 2004/0168608 A1    Sep. 2, 2004

Related U.S. Application Data

(60) Provisional application No. 60/426,514, filed on Nov. 15, 2002.

(51) Int. Cl.
*C09D 11/02* (2006.01)

(52) U.S. Cl. .................. 106/31.27; 106/31.6; 523/160; 523/161; 347/100

(58) Field of Classification Search ............. 106/31.27, 106/31.6; 523/160, 161; 347/100
See application file for complete search history.

(56) References Cited

U.S. PATENT DOCUMENTS

| | | |
|---|---|---|
| 4,246,154 A | 1/1981 | Yao |
| 5,085,698 A | 2/1992 | Ma et al. |
| 5,231,131 A | 7/1993 | Chu et al. |
| 5,518,534 A | 5/1996 | Pearlstine et al. |
| 5,519,085 A | 5/1996 | Ma et al. |
| 5,554,739 A | 9/1996 | Belmont |
| 5,555,008 A | 9/1996 | Stoffel et al. |
| 5,571,311 A | 11/1996 | Belmont et al. |
| 5,571,331 A | 11/1996 | Schertler et al. |
| 5,609,671 A | 3/1997 | Nagasawa |
| 5,672,198 A | 9/1997 | Belmont |
| 5,698,016 A | 12/1997 | Adams et al. |
| 5,700,317 A | 12/1997 | Adamic |
| 5,707,432 A | 1/1998 | Adams et al. |
| 5,708,095 A | 1/1998 | Grezzo Page et al. |
| 5,713,993 A | 2/1998 | Grezzo Page et al. |
| 5,718,746 A | 2/1998 | Nagasawa et al. |
| 5,747,562 A | 5/1998 | Mahmud et al. |
| 5,749,950 A | 5/1998 | Mahmud et al. |
| 5,750,594 A | 5/1998 | Page et al. |
| 5,801,738 A | 9/1998 | Stoffel et al. |
| 5,803,959 A | 9/1998 | Johnson et al. |
| 5,837,045 A | 11/1998 | Johnson et al. |
| 5,846,307 A | 12/1998 | Nagasawa et al. |
| 5,851,280 A | 12/1998 | Belmont et al. |
| 5,861,447 A | 1/1999 | Nagasawa et al. |
| 5,885,335 A | 3/1999 | Adams et al. |
| 5,895,522 A | 4/1999 | Belmont et al. |
| 5,922,118 A | 7/1999 | Johnson et al. |
| 5,928,419 A | 7/1999 | Uemura et al. |
| 5,976,233 A | 11/1999 | Osumi et al. |
| 5,998,501 A | 12/1999 | Tsutsumi et al. |
| 6,022,908 A * | 2/2000 | Ma et al. .................... 523/160 |
| 6,057,384 A | 5/2000 | Nguyen et al. |
| 6,099,632 A | 8/2000 | Nagasawa et al. |
| 6,123,759 A | 9/2000 | Mise et al. |
| 6,153,001 A | 11/2000 | Suzuki et al. |
| 6,183,063 B1 | 2/2001 | Bolash et al. |
| 6,221,141 B1 | 4/2001 | Takada et al. |
| 6,221,142 B1 | 4/2001 | Wang et al. |
| 6,221,143 B1 | 4/2001 | Palumbo |
| 6,247,808 B1 * | 6/2001 | Ma et al. .................... 347/100 |
| 6,277,183 B1 | 8/2001 | Johnson et al. |
| 6,281,267 B1 | 8/2001 | Parazak |
| 6,299,941 B1 | 10/2001 | Sacripante et al. |
| 6,309,062 B1 * | 10/2001 | Hickman et al. ............. 347/96 |
| 6,329,446 B1 | 12/2001 | Sacripante et al. |
| 6,332,919 B1 | 12/2001 | Osumi et al. |
| 6,350,011 B1 | 2/2002 | Karlinski |
| 6,375,317 B1 | 4/2002 | Osumi et al. |
| 6,433,117 B1 | 8/2002 | Ma et al. |
| 6,443,555 B1 | 9/2002 | Silverbrook et al. |
| 6,460,987 B1 * | 10/2002 | Katsuragi et al. ........... 347/100 |
| 6,467,870 B1 | 10/2002 | Matsumoto et al. |
| 6,467,874 B1 | 10/2002 | Williams et al. |
| 2001/0035110 A1 | 11/2001 | Kato |
| 2002/0033863 A1 | 3/2002 | Silverbrook |
| 2002/0101475 A1 | 8/2002 | Grose et al. |

FOREIGN PATENT DOCUMENTS

| | | |
|---|---|---|
| EP | 0 769 509 B1 | 4/1997 |
| EP | 1 086 997 A2 | 3/2001 |
| EP | 1 090 966 A1 | 4/2001 |
| EP | 1 114 851 A1 | 7/2001 |
| EP | 1 122 286 A1 | 8/2001 |
| EP | 1 127 707 A1 | 8/2001 |
| EP | 1 146 090 A2 | 10/2001 |
| EP | 1 158 030 A2 | 11/2001 |
| EP | 1 167 471 A2 | 1/2002 |
| WO | WO 01/10963 A1 | 2/2001 |
| WO | WO 01/25340 A1 | 4/2001 |
| WO | WO 01/94476 A2 | 12/2001 |
| WO | WO 04/046266 A1 | 6/2004 |

OTHER PUBLICATIONS

International Search Report

* cited by examiner

*Primary Examiner*—J. A. Lorengo
*Assistant Examiner*—Veronica F. Faison
(74) *Attorney, Agent, or Firm*—Steven C Benjamin

(57) ABSTRACT

This invention pertains to an ink set for inkjet printing, in particular to an ink set wherein all the inks are mutually interactive so as to reduce bleed of one color into another. The invention also pertains to a method of inkjet printing with this mutually interactive ink set.

16 Claims, No Drawings

INTERACTIVE INK SET FOR INKJET PRINTING

CROSS-REFERENCE TO RELATED APPLICATION

This application claims priority under 35 U.S.C. §119 from U.S. Provisional Application Ser. No. 60/426,514 (filed Nov. 15, 2002), which is incorporated by reference herein as if fully set forth.

BACKGROUND OF THE INVENTION

This invention pertains to an ink set for inkjet printing, in particular to an ink set wherein all the inks are mutually interactive so as to reduce bleed of one color into another. The invention also pertains to a method of inkjet printing with this mutually interactive ink set.

Inkjet printing is a non-impact printing process in which droplets of ink are deposited on print media, such as paper, to form the desired image. The droplets are ejected from a printhead in response to electrical signals generated by a microprocessor.

Inkjet printers offer low cost, high quality printing and have become a popular alternative to other types of printers. However, inkjet printers are presently unable to match the speed of laser printers, for example, due in large part to the relatively slow dry time of inkjet inks as well as slow-down due to bleed control algorithms in the printer software.

Bleed is a particular problem in inkjet printing because the relatively low viscosity inks used therein tend to spread, and because ink jet printers have the capability of printing three or four primary colors in simultaneous (or near simultaneous) fashion. Bleed is manifested in a mixing or "bleeding" of two printing liquids at their interface, whereby the line of demarcation between the two printing liquids is obscured. Bleeding may cause undesired color formation at the interface and a concurrent loss of resolution, color separation, edge acuity and color purity in the image. The more contrasting the two adjacent liquids are in color (such as black and yellow), the more visible the bleed. Bleed is also particularly noticeable when the mixing of two inks produces a secondary color, such as when blue and yellow mix to produce green.

Various solutions to the bleed problem have been proposed. Some methods involve changing the ink environment to reduce bleed. For instance, heated platens and other heat sources, along with specially formulated paper, have been employed to reduce bleed. However, these add cost, and bleed is preferably controlled without such means.

Another method, and the one most commonly used, involves a delay in applying the second printing liquid until the first printing liquid is completely dry. This method is also disadvantageous, not only because of its inefficiencies, but also because it is not particularly effective. For example, it has been observed that bleed may occur even if the first printing liquid is dry, which is believed to be caused by the colorants of the first printing liquid becoming "redissolved" in the liquid medium of the second printing liquid. Thus, the more soluble the components of the first printing liquid in the liquid medium, the more likely bleed will occur even if the first printing liquid is dry. This method is particularly disadvantageous in ink jet printing applications because it places an arbitrary limitation on the speed of generating multi-colored prints.

Another proposed method for reducing bleed is to apply the two printing liquids at a distance from one another such that no intermingling or mixing of the printing liquids can occur. This method is not an effective solution to the problem, however, and produces images having poor resolution.

Other proposed solutions to the problem of bleed involve changing the ingredients of the ink to include, for example, surfactants or other penetrants. These ingredients can reduce bleed, in certain formulations, but edge acuity and optical density usually suffer.

Some methods are directed at reducing two-way bleed from, for example, black-to-color and especially black-to-yellow. Although these two-way combinations are helpful to a degree, preferably bleed is reduced or eliminated in all combinations of colors in the set.

U.S. Pat. No. 5,700,317, U.S. Pat. No. 6,022,908 and U.S. Pat. No. 6,460,987 all disclose a four-color ink set wherein all inks in the set are designed to interact and thereby reduce bleed. However, these references disclose ink sets wherein one or more of the colorants is a soluble dye (the ink being a solution of the dye), and further disclose no more than the use of four colors. Preferably, for improved light fastness, an interactive ink set can be comprised entirely of pigment colorants. And preferably, for expanded gamut, an interactive ink set can be comprised of more than four colors.

The disclosures of all of the above-identified publications are incorporated by reference herein for all purposes as if fully set forth.

Accordingly, a need still exists for inkjet ink sets that can provide improved print quality (especially, reduced bleed between all colors) and improved edge-acuity while also allowing rapid print speed.

SUMMARY OF THE INVENTION

In accordance with one aspect of the present invention, there is provided an ink set of mutually interactive inks comprising at least four inks selected from categories a–d as follows:

a) an aqueous anionic ink with a relative high pKa comprising a colorant and an aqueous vehicle;

b) an aqueous anionic ink with a relative low pKa, comprising a colorant and an aqueous vehicle, which is adjusted to a pH below the pKa of any ink in the set from category a;

c) an aqueous non-quarternized cationic ink comprising a colorant and an aqueous vehicle and d) an aqueous quarternized cationic ink comprising a colorant and an aqueous vehicle, wherein no more than three inks from any one category are present in the set, and all inks from any one category further comprise complementary incompatibility ingredients so as to be mutually interacting with one another by an aqueous phase change mechanism.

In another aspect, the present invention provides an ink set of mutually interactive inks comprising at least four inks selected from the group consisting of:

(a1) a first aqueous anionic ink comprising a first colorant, a first aqueous vehicle and, optionally, a first incompatibility additive, said first anionic ink having a first pKa;

(a2) a second aqueous anionic ink comprising a second colorant, a second aqueous vehicle and, optionally, a second incompatibility additive, said second anionic ink having a second pKa;

(a3) a third aqueous anionic ink comprising a third colorant, a third aqueous vehicle and, optionally, a third incompatibility additive, said third anionic ink having a third pKa;

(b1) a fourth aqueous anionic ink comprising a fourth colorant, a fourth aqueous vehicle and, optionally, a fourth incompatibility additive, said fourth anionic ink having a fourth pKa, provided that, if one or more of inks (a1), (a2) and (a3) is present:
  (i) the fourth pKa is lower than any of the first, second or third pka's, and
  (ii) the fourth anionic ink has a pH below any of the the first, second or third pka's;

(b2) a fifth aqueous anionic ink comprising a fifth colorant, a fifth aqueous vehicle and, optionally, a fifth incompatibility additive, said fifth anionic ink having a fifth pKa, provided that, if one or more of inks (a1), (a2) and (a3) is present:
  (i) the fifth pKa is lower than any of the first, second or third pka's, and
  (ii) the fifth anionic ink has a pH below any of the the first, second or third pka's;

(b3) a sixth aqueous anionic ink comprising a sixth colorant, a sixth aqueous vehicle and, optionally, a sixth incompatibility additive, said sixth ink having a sixth pKa, provided that, if one or more of inks (a1), (a2) and (a3) is present:
  (i) the sixth pKa is lower than any of the first, second or third pka's, and
  (ii) the sixth anionic ink has a pH below any of the first, second or third pka's;

(c1) a first aqueous non-quarternized cationic ink comprising a seventh colorant, a seventh aqueous vehicle and, optionally, a seventh incompatibility additive;

(c2) a second aqueous non-quarternized cationic ink comprising an eighth colorant, an eighth aqueous vehicle and, optionally, an eighth incompatibility additive;

(c3) a third aqueous non-quarternized cationic ink comprising a ninth colorant, a ninth aqueous vehicle and, optionally, a ninth incompatibility additive;

(d1) a first aqueous quarternized cationic ink comprising a tenth colorant, a tenth aqueous vehicle and, optionally, a tenth incompatibility additive;

(d2) a second aqueous quarternized cationic ink comprising an eleventh colorant, an eleventh aqueous vehicle and, optionally, an eleventh incompatibility additive; and (d3) a third aqueous quarternized cationic ink comprising a twelfth colorant, a twelfth aqueous vehicle and, optionally, a twelfth incompatibility additive;

provided that:

(a1), (a2) and (a3) are different and, if more than one of (a1), (a2) and (a3) is present, then each of (a1), (a2) and (a3) this is present further comprises, respectively, the first, second and third incompatibility additive, wherein the first, second and third incompatibility additives are incompatible with one another so as to induce aqueous phase separation of the first, second and third aqueous vehicles in the event of contact therebetween;

(b1), (b2) and (b3) are different and, if more than one of (b1), (b2) and (b3) is present, then each of (b1), (b2) and (b3) that is present further comprises, respectively, the fourth, fifth and sixth incompatibility additive, wherein the fourth, fifth and sixth incompatibility additives are incompatible with one another so as to induce aqueous phase separation of the fourth, fifth and sixth aqueous vehicles in the event of contact therebetween;

(c1), (c2) and (c3) are different and, if more than one of (c1), (c2) and (c3) is present, then each of (c1), (c2) and (c3) this is present further comprises, respectively, the seventh, eighth and ninth incompatibility additive, wherein the seventh, eighth and ninth incompatibility additives are incompatible with one another so as to induce aqueous phase separation of the seventh, eighth and ninth aqueous vehicles in the event of contact therebetween; and (d1), (d2) and (d3) are different and, if more than one of (d1), (d2) and (d3) is present, then each of (d1), (d2) and (d3) that is present further comprises, respectively, the tenth, eleventh and twelfth incompatibility additive, wherein the tenth, eleventh and twelfth incompatibility additives are incompatible with one another so as to induce aqueous phase separation of the tenth, eleventh and twelfth aqueous vehicles in the event of contact therebetween.

For clarity, reference herein to a "first", "second" etc. component should not be construed to imply that such components are different, as they may in fact be the same. Each of inks (a1)–(a3), (b1)–(b3), (c1)–(c3) and (d1)–(d3), however, is different. For example, a first ink (a1) and a second ink (a2) may both contain the same pigment as the colorant (first and second colorants are identical), but in varying amounts so as to produce a full-color strength ink and a "light" ink (different inks).

In addition, the terms "incompatibility ingredient(s)" and incompatible additive(s)" may be used interchangeably.

The present invention also relates to methods of ink jet printing using the above-identified ink sets.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

DETAILED DESCRIPTION OF THE PREFERRED EMBODIMENTS

In accordance with the present invention, each of the inks in the ink set of the present invention is designed to be mutually interactive with all of the other inks in the ink set in order to reduce bleed of one color into another. For each ink-ink combination there is an interaction that causes the mixture (bleed) of colors on adjacent pixels to be reduced, thus improving print quality, although such bleed may not entirely be prevented.

Each of the inks in the ink set individually comprises a colorant, an aqueous vehicle and, optionally, other ingredients as described below (such as, for example, the incompatibility additive) or as are otherwise well-known to those of ordinary skill in the relevant art (such as, for example, additives to enhance performance of one or more characteristics of the ink).

The colorant can be soluble or insoluble. Preferred for use are "insoluble" colorants, more preferably particulate colorants, and especially pigments.

By "insoluble" colorant is meant a colorant that does not form (to a significant degree) a solution in the aqueous vehicle. Insoluble colorants can, for example, be particulate and dispersed in the aqueous vehicle. Insoluble colorants can also be dissloved in a water-imiscible oil phase and (micro)emulsified in the aqueous vehicle. Preferred are the particulate colorants, and inks that comprise dispersions of these particulate colorants.

Particulate colorants include pigments and disperse dyes, and soluble dyes that are immobilized on/in an insoluble matrix such as a dispersed polymer matrix.

Particulate colorants (such as pigments) are traditionally stabilized to dispersion in a vehicle by dispersing agents, such as polymeric dispersants or surfactants. More recently though, so-called "self-dispersible" or "self-dispersing" pigments (hereafter "SDP") have been developed. As the name would imply, SDPs are dispersible in a vehicle without dispersants. See, for example, U.S. Pat. No. 5,554,739, U.S. Pat. No. 5,571,311, U.S. Pat. No. 5,609,671, U.S. Pat. No. 5,672,198, U.S. Pat. No. 5,698,016, U.S. Pat. No. 5,707,432, U.S. Pat. No. 5,718,746, U.S. Pat. No. 5,747,562, U.S. Pat. No. 5,749,950, U.S. Pat. No. 5,803,959, U.S. Pat. No. 5,837,045, U.S. Pat. No. 5,846,307, U.S. Pat. No. 5,851,280, U.S. Pat. No. 5,861,447, U.S. Pat. No. 5,885,335, U.S. Pat. No. 5,895,522, U.S. Pat. No. 5,922,118, U.S. Pat. No. 5,928,419, U.S. Pat. No. 5,976,233, U.S. Pat. No. 6,057,384, U.S. Pat. No. 6,099,632, U.S. Pat. No. 6,123,759, U.S. Pat. No. 6,153,001, U.S. Pat. No. 6,221,141, U.S. Pat. No. 6,221,142, U.S. Pat. No. 6,221,143, U.S. Pat. No. 6,277,183, U.S. Pat. No. 6,281,267, U.S. Pat. No. 6,329,446, U.S. Pat. No. 6,332,919, U.S. Pat. No. 6,375,317, US2001/0035110, EP-A-1086997, EP-A-1114851, EP-A-1158030, EP-A-1167471, EP-A-1122286, WO01/10963, WO01/25340 and WO01/94476, the disclosures of which are incorporated by reference herein for all purposes as if fully set forth.

When the colorant is particulate, it is desirable to use small particles for maximum color strength and good jetting. The particle size may generally be in the range of from about 0.005 micron to about 15 microns, is typically in the range of from about 0.005 to about 1 micron, is preferably from about 0.005 to about 0.5 micron, and is more preferably in the range of from about 0.01 to about 0.3 micron.

"Aqueous vehicle" refers to water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (the disclosure of which is incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The amount of aqueous vehicle in the ink is typically in the range of about 70% to about 99.8%, and preferably about 80% to about 99.8%, based on total weight of the ink.

Other ingredients may be formulated into the inkjet ink, to the extent that such other ingredients do not interfere with the mutually interactive mechanisms of the ink sets, which may be readily determined by routine experimentation. Such other ingredients are in a general sense well known in the art.

For example, surfactants may be used, typically in the amount of about 0.01–5% and preferably about 0.2–2%, based on the total weight of the ink.

Biocides may be used to inhibit growth of microorganisms.

Penetrating agents such as glycol ethers and 1,2-alkanediols may also be added to the formulation. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether. 1,2-Alkanediols are preferably 1,2-C1–6 alkanediols, most preferably 1,2-hexanediol.

The amount of glycol ether(s) and 1,2-alkanediol(s) added must be properly determined, but is typically in the range of from about 1 to about 15% by weight and more typically about 2 to about 10% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

In addition, binders such as polyurethanes may also be added.

Examples of specific inkjet ink formulations are given in many of the references cited herein.

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element, or ejection conditions for a thermal head, for either a drop-on-demand device or a continuous device, and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Ionic Character of the Ink

The inks of this invention are characterized in one aspect by their ionic character, and each category of ink generally described above (a-d) has a specified ionic character.

Ionic character of an ink is primarily determined by the ionic character of the colorant contained therein. Thus anionic ink would comprise anionic colorant by which is meant a colorant yielding, in aqueous medium, colored anions (soluble dye) or colored particles with anionic surface charge. Conversely, cationic ink would comprise cationic colorant by which is meant a colorant yielding, in aqueous medium, colored cations (soluble dye) or colored particles with cationic surface charge. Particle surface charge can be imparted, for example, by a dispersant with anionic or cationic moieties coating an organic pigment, or by attaching groups with anionic or cationic moieties to the particle surface (as in an SDP).

When the colorant in the ink is nonionic (neutral), the ionic character of the ink is derived from an ionizable polymer dissolved or dispersed therein. Thus anionic ink also can comprise a nonionic colorant and a soluble or dispersed anionic polymer. Likewise, cationic ink also can comprise a nonionic colorant and a soluble or dispersed cationic polymer.

Anionic moieties referred to herein can be any suitable anionic moiety but are preferably (I) or (II):

wherein Z is selected from the group consisting of conjugate acids of organic bases; alkali metal ions; "onium" ions such as ammonium, phosphonium and sulfonium ions; and substituted "onium" ions such as tetraalkylammonium, tetraalkyl phosphonium and trialkyl sulfonium ions; or any other suitable cationic counterion. Useful anionic moieties also include phosphates and phosphonates.

Anionic inks are further characterized by the pKa ("high" or "low") of their anionic moiety. "High" and "low" in the context of the present invention are not, unless otherwise stated, considered in absolute terms; rather, they are considered relative to one another. In other words, "high" is higher than "low", and "low" is lower than "high".

In more absolute terms, a "high" pKa is typically above about 4 or 4.5, and a "low" pKa is typically below about 5 or 4.5. Carboxylates are generally useful as high pKa moieties and sulfonates are generally useful as low pKa moieties.

Preferred cationic moieties may be characterized by the general formula (III):

wherein A is N, P or S; $R_1$–$R_3$ are each independently H, alkyl or alkyl ether of 1–20 carbon atoms, or aryl or alkylaryl having 1–9 carbon atoms, with the proviso that $R_3$ is not present when A is S; and wherein X is an anion selected from the group consisting of halides, conjugate bases of organic acids, and conjugate bases of inorganic acids or any other suitable anionic counter ion. When A is N or P and $R_1$–$R_3$ are other than H, the cationic species is said to be quarternary or quarternized.

Herein, cationic inks are characterized as being quarternized or non-quarternized. The term non-quarternized (or non-quarternary) means all cationic species other than quarternized (or quarternary) species.

Anionic dyes typically contain carboxylic or sulfonic acid groups as the ionic moiety and encompass all acid dyes. The types of anionic dyes most useful in this invention are Acid, Direct, Food, Mordant and Reactive dyes. Anionic dyes are preferably selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

Cationic dyes usually contain quaternary nitrogen groups and encompass all basic dyes. The types of cationic dyes that are most useful include the basic dyes and some of the mordant dyes that are designed to bind acidic sites on a substrate, such as fibers. Useful types of such dyes include, for example, the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known in the art.

Disperse dyes which are vehicle insoluble colorants are also useful in this invention. Examples of many types of useful soluble dyes are disclosed in U.S. Pat. No. 6,460,987 (the disclosure of which is incorporated by reference herein for all purposes as if fully set forth).

Dyes immobilized on/in a matrix can be found, for example, in U.S. Pat. No. 5,998,501, U.S. Pat. No. 6,299,941, U.S. Pat. No. 4,246,154, EP-A-0769509 and EP-A-1127707 (the disclosures of which are incorporated by reference herein for all purposes as if fully set forth).

Anionic SDPs include sulfonated species such as those described, for example, in previously incorporated U.S. Pat. No. 5,571,331, U.S. Pat. No. 5,928,419 and EP1146090. Anionic SDPs also include carboxylated species such as those described, for example, in previously incorporated U.S. Pat. No. 5,571,311, U.S. Pat. No. 5,609,671 and WO0194476. Cationic SDPs include species such as those described, for example, in previously incorporated U.S. Pat. No. 6,221,143.

Dispersants for traditional pigment dispersions are most often either structured or random polymers, although structured polymers are preferred for use as dispersants for reasons well known in the art. The term "structured polymer" means polymers having a block, branched or graft structure. Such polymer dispersants typically comprise both hydrophobic and hydrophilic monomers. Generally, the hydrophillic monomers contain the moieties which define the ionic character to the polymer. Some examples of hydrophilic monomers are methacrylic acid, acrylic acid, dimethylaminoethyl(meth)acrylate and salts thereof and quaternary salts of dimethylaminoethyl(meth)acrylate. Some examples of hydrophobic monomers are methyl methacrylate, n-butyl methacrylate, 2-ethylhexyl methacrylate, benzyl methacrylate, 2-phenylethyl methacrylate and the corresponding acrylates.

Particularly preferred structured polymers having primarily carboxyl anionic moieties are AB or BAB block copolymers disclosed in previously incorporated U.S. Pat. No. 5,085,698; ABC block copolymers disclosed in U.S. Pat. No. 5,519,085; and graft polymers disclosed in U.S. Pat. No. 5,231,131. Particularly preferred structured polymers having primarily sulfonate or phosphate anionic moieties disclosed in U.S. Pat. No. 5,708,095 and U.S. Pat. No. 6,433,117. Particularly preferred structured polymers having primarily quarternized or non-quarternized cationic moieties are disclosed in U.S. Pat. No. 5,801,738 and U.S. Pat. No. 5,555,008. The disclosures of these publications are incorporated by reference herein for all purposes as if fully set forth.

The number average molecular weight of the polymer dispersant should be less than about 50,000 Daltons, preferably less than about 10,000 and most preferably less than about 6,000. Polymers having a polydispersity (the relationship between number average molecular weight and weight average molecular weight) between about 1–4, most preferably between about 1–2, are most advantageous.

Representative commercial dry and presscake pigments which can be suitable for dispersion with dispersant or for treatment to make SDP are disclosed in previously incorporated U.S. Pat. No. 5,085,698.

Modes of Ink Interaction

As noted previously, each ink in the ink set will interact with every other ink in the set so as to alleviate bleed. To allow an ink set with at least four inks, multiple mechanisms for interaction must be available. For any ink-ink interaction, more than one mechanism may be at work.

One mechanism of interaction for control of bleed is the reaction of an anionic ink with high pKa and high pH and an anionic ink with low pKa and low pH wherein the pH of low pH ink is close to or below the pKa of the high pH ink so that, when mixed, the low pH ink interacts with the high pH ink to destabilize it. It will be appreciated that the critical parameter is the relative pKa of the anionic moiety in the two inks and not necessarily the absolute value. This sort of interaction between two inks is found, for example, in U.S. Pat. No. 5,713,993 (the disclosure of which is incorporated by reference herein for all purposes as if fully set forth).

Another mechanism of interaction for control of bleed is the reaction of an anionic ink and a cationic ink. This sort of interaction between two inks is found, for example, in U.S. Pat. No. 5,801,738 and U.S. Pat. No. 5,555,008 (the disclosures of which are incorporated by reference herein for all purposes as if fully set forth).

Another mechanism of interaction for control of bleed is the reaction of a quarternized cationic ink and a non-quarternized cationic ink. This sort of interaction between two inks is found, for example, in U.S. Pat. No. 5,750,594 and U.S. Pat. No. 5,518,534 (the disclosures of which are incorporated by reference herein for all purposes as if fully set forth).

Another mechanism for control of bleed is aqueous phase change interaction. The interaction in this case is a mutual incompatibilty and does not necessarily rely on ionic interaction. This sort of interaction between two inks is found, for example, in U.S. Pat. No. 5,700,317 (the disclosure of which is incorporated by reference herein for all purposes as if fully set forth).

The concept of selectively distributing substances between aqueous phases (aqueous phase separation) using polymer immiscibility is known and well-documented in the biotechnology field. (see, e.g., *Partition of Cell Particles and Macromolecules*, Albertsson, $3^{rd}$ ed., John Wiley & Sons.) In general, mixtures of solutions of dissimilar polymers in a given solvent induce phase separation. More than two phases may be induced by employing more than two dissimilar polymers: there will be as many phases as unlike polymers in the solvent.

Aqueous phase separation can be used to control bleed in inkjet inks by incorporating a polymer in one ink and a second species in the other ink that is immiscible with the polymer (incompatibility ingredients/additives), such that separate aqueous phases will be formed given interaction between the two inks. Thus, if these two inks are printed adjacently to one another, an interfacial boundary will arise between the two and there will be a reduced tendency for the inks to mix or bleed. Likewise, bleed control between three inks can be achieved by incorporating three mutually immiscible polymers one each in the three different inks The so-called "second species" that, upon interaction with the polymer, co-induces aqueous phase separation, may be another polymer or a low-molecular weight component. Essentially, any compound that induces aqueous phase separation in an aqueous solution upon interaction with a polymer contained therein may serve as the second species. In any case, the second species must be substantially immiscible with the polymer against which it is to be paired. Thus, if two polymers are paired in adjacently-printed inks, the polymers must be sufficiently different to be immiscible and to thereby induce aqueous phase separation. Because of the large size of polymer molecules, phase separation occurs in polymer-polymer mixtures even for polymers that are very similar and present at very low concentrations. Factors important in determining whether two polymers are sufficiently different include the average molecular weight, polydispersity, and the concentration of the polymer in the ink. It is contemplated that routine experimentation by one having ordinary skill in the art will be sufficient to determine whether two particular polymers are sufficiently different in aqueous solution to induce aqueous phase separation.

To capture these interactions and build an interactive ink set, the following categories of ink are defined.

Category (a)—Aqueous Anionic Ink, High pKa

Ink comprised of anionic colorant dissolved or dispersed in an aqueous vehicle wherein the pKa of the anionic moiety(ies) is relatively higher than a category (b) ink of this invention. In place of anionic colorant, the ink can comprise non-ionic colorant and soluble or dispersed anionic polymer wherein the anionic moieties on the polymer have a relatively higher pKa than category (b) ink of this invention. The pKa of an ink in this category will preferably be above about 4, and a preferred anionic species is carboxyl. For greater stability, the pH of the ink will generally be adjusted above its pKa, typically to a pH in the range of 6.5–9, more typically a range of 7–8.

Category (b)—Aqueous Anionic Ink, Low pKa

Ink comprised of anionic colorant dissolved or dispersed in an aqueous vehicle wherein the pKa of the anionic moiety(ies) is relatively lower than category (a) ink(s) of this invention and the pH of the ink is maintained at or below the pKa of the category (a) ink(s) of this invention. In place of anionic colorant, the ink can comprise nonionic colorant and soluble or dispersed anionic polymer wherein the anionic moieties on the polymer have a relatively lower pKa than category (a) ink(s) of this invention. The pKa of an ink in this category will preferably be below about 5, and a preferred anionic species is sulfonate. For greater stability, the pH of the ink will generally be adjusted above its pKa but not higher than the pKa of any category A ink. The absolute value of pH and pKa is not critical as long as the pH of the B ink is below the pKa of any category (a) ink in the set.

Category C—Aqueous Non-Quarternized Cationic Ink

Ink comprised of non-quarternized cationic colorant dispersed in an aqueous vehicle. In place of non-quarternized cationic colorant, the ink can comprise nonionic colorant and soluble or dispersed non-quarternized cationic polymer.

Category D—Aqueous Quarternized Cationic Ink

Ink comprised of quarternized cationic colorant dispersed in an aqueous vehicle. In place of quarternized cationic colorant, the ink can comprise nonionic colorant and soluble or dispersed quarternized cationic polymer.

More than One Ink from a Category

When the ink set contains more than one ink from any category (a)–(d), all inks in the same category are formulated to interact with each other by an aqueous phase change mechanism, as herein before described. That way all inks within a category will be interacting, and they will also be interactive with all inks from any other category. The polymers employed to achieve aqueous phase separation in accordance with this mode of interaction are preferably water soluble nonionic polymers. Use of nonionic polymers simplifies formulation on the ink as it avoids any complications of additional ionic interaction or pH sensitivity.

Examples of suitably employed nonionic polymers include, but are not limited to, polyethylene glycols and derivatives thereof having a minimum average molecular weight of about 200; polypropylene glycols and derivatives thereof having a minimum average molecular weight of about 200; polysaccharides and derivatives thereof, polyvinylalcohols and derivatives thereof having an average molecular weight within the range of about 10,000 to 200,000; polyvinylpyrrolidones and derivatives thereof having an average molecular weight within the range of about 2,000 to 500,000; polysucrose and derivatives thereof having an average molecular weight within the range of about 40,000 to 400,000, such as Ficoll® (a polysucrose commercially available from Pharmacia Inc.); and ethoxy- and propoxylated glycerols and derivatives thereof having an average molecular weight within the range of about 500 to 10,000.

Specific examples of suitably-employed derivatives of polyethylene glycols include, but are not limited to, polyethylene glycol methyl ether and polyethylene glycol bis (carboxymethyl)ether. Examples of suitably-employed polysaccharides include, but are not limited to, methylcellulose, carboxymethylcellulose, and dextran, with the dextran and dextran derivatives having an average molecular weight within the range of about 3,000 to 2,000,000. Particular examples of derivatives of dextran suitably employed in the practice of the invention include diethylaminoethyldextran and hydroxypropyldextran. It is further noted that dextran may be regarded as representative of a group of polymers including, but not limited to, glycogen, levan and soluble starch. Particular examples of ethoxy- and propoxylated glycerols include, but are not limited to, LEG ("Liponics® ethoxylated glycerol"); glycerol propoxylates and derivatives thereof having an average molecular weight within the range of about 725 to 4,100; glycerol propoxylate (methoxylate-co-propoxylate) and derivatives thereof having an average molecular weight within the range of about 725 to 4,100; and glycerol propoxylate(methoxylate-.beta.-ethoxylatetriol) and derivatives thereof having an average molecular weight within the range of about 725 to 4,800.

Even more specifically, to achieve aqueous phase change interaction between three inks in the same a-d category, the three inks can each be formulated with different molecular weight polyethyleneglycol (PEG) polymer (e.g. PEG 4000, PEG 2000 and PEG 7500). Also, phase change interaction can be achieved between a pair of inks by formulating one with dextran and the other with PEG 7500. Likewise, phase change interaction can be achieved between a pair of inks by formulating one with polyvinylprolidone (PVP) and the other with ethoxylatedglycol (LEG). These interactions are described in detail in previously incorporated reference U.S. Pat. No. 5,700,317, and reference may be had thereto for further information.

Preferred Embodiments

Generally, the colorants in an ink set are all of the same type: pigment or dye, although in a dye set, it is desirable to use a pigment such as carbon black as the black colorant because black dyes tend to have unacceptably low optical density. Thus, in one preferred embodiment, all inks of the at least four inks of the inventive ink set comprise pigment colorant. In another preferred embodiment all inks of the at least four inks of the inventive ink set comprise soluble dye colorant. In another preferred embodiment one of the inks of the at least four inks of the inventive ink set comprises black pigment colorant and the remaining inks comprise soluble dye colorant.

Each "ink" is intended to mean an ink of different color. Diluted inks of the same color are not considered a different color although, if desired, the formulation of the diluted ink could be derived from a different category. Dilutions (also referred to as "lights" or "mediums") are sometimes used in an ink set to achieve more subtle gradients or tones.

The inventive ink set comprises at least four inks, preferably at least a cyan, magenta, yellow and black ink. In one embodiment the at least four inks comprise at least one ink from each of categories (a)–(d). In another embodiment the at least four inks comprise at least one ink from each of categories (a)–(d) and the category (a) ink is comprised of anionic self-dispersing carbon black colorant. In another embodiment the at least four inks comprise at least one ink from each of categories (a)–(d) and the category (b) ink is comprised of anionic self-dispersing carbon black colorant. In another embodiment the at least four inks comprise at least one ink from each of categories (a)–(d) and the category (c) ink is comprised of cationic (non-quarternized) self-dispersing carbon black colorant. In another embodiment the at least four inks comprise at least one ink from each of categories (a)–(d) and the category (d) ink is comprised of cationic (quarternized) self-dispersing carbon black colorant.

Preferably, in an ink set comprising at least four inks, there are no more than two inks from any one category.

In another embodiment, the inventive ink set comprises at least five inks, preferably at least a cyan, magenta, yellow and black ink and at least one additional color such as, for example, orange or green.

The inventive ink set is particularly advantageous for high-speed printing and in particular for printing in one pass. Thus an additional aspect of the present invention is a method of inkjet printing wherein an interactive ink set is applied to a substrate in one pass.

An especially preferred embodiment is printing from a page-wide array. A page-wide array refers to a printer arrangement where printhead, or a series of printheads, extend the width of the substrate and are fixed in place; the substrate is moved past the array and the image is printed in one pass. Printing systems based on page-wide arrays can be found, for example, in U.S. Pat. No. 6,183,063, U.S. Pat. No. 6,350,011, US20020101475, U.S. Pat. No. 6,467,870, U.S. Pat. No. 6,443,555, US20020033863 and U.S. Pat. No. 6,467,874 (the disclosures of which are incorporated by reference herein for all purposes as if fully set forth).

We claim:

1. An ink set of mutually interactive inks comprising at least four inks selected from categories (a)–(d) as follows:
   (a) aqueous anionic ink with a relative high pKa comprising a colorant and aqueous vehicle;
   (b) aqueous anionic ink with a relative low pKa, comprising a colorant and aqueous vehicle, which is adjusted to a pH below the pKa of any ink in the set from category a;
   (c) aqueous non-quarternized cationic ink comprising colorant and aqueous vehicle and
   (d) aqueous quarternized cationic ink comprising colorant and aqueous vehicle,
wherein at least one ink from each category (a)–(d) is present in the set, no more than three inks from any one category are present in the set, and all inks from any one category further comprise complementary incompatibility ingredients so as to be mutually interacting with one another by an aqueous phase change mechanism.

2. The ink set of claim 1, wherein no more than two inks from any one category (a)–(d) are present in the set.

3. The ink set of claim 1, wherein all the colorants are pigment.

4. The ink set of claim 1, wherein all the colorants are dye.

5. The ink set of claim 1, wherein the at least four inks are comprised of at least one ink with cyan colorant, at least one ink with magenta colorant, at least one ink with yellow colorant and at least one ink with black colorant.

6. The ink set of claim 1, wherein one of the at least fours inks is comprised of carbon black pigment as the colorant and the remaining inks in the set are comprised of dye as the colorant.

7. An ink set of mutually interactive inks comprising at least four inks selected from the group consisting of:
   (a1) a first aqueous anionic ink comprising a first colorant, a first aqueous vehicle and, optionally, a first incompatibility additive, said first anionic ink having a first pKa;
   (a2) a second aqueous anionic ink comprising a second colorant, a second aqueous vehicle and, optionally, a second incompatibility additive, said second anionic ink having a second pKa;
   (a3) a third aqueous anionic ink comprising a third colorant, a third aqueous vehicle and, optionally, a third incompatibility additive, said third anionic ink having a third pKa;
   (b1) a fourth aqueous anionic ink comprising a fourth colorant, a fourth aqueous vehicle and, optionally, a fourth incompatibility additive, said fourth anionic ink having a fourth pKa, provided that, if one or more of inks (a1), (a2) and (a3) is present:
      (i) the fourth pKa is lower than any of the first, second or third pKa's, and
      (ii) the fourth anionic ink has a pH below any of the the first, second or third pka's;
   (b2) a fifth aqueous anionic ink comprising a fifth colorant, a fifth aqueous vehicle and, optionally, a fifth incompatibility additive, said fifth anionic ink having a fifth pKa, provided that, if one or more of inks (a1), (a2) and (a3) is present:
      (i) the fifth pKa is lower than any of the first, second or third pKa's, and
      (ii) the fifth anionic ink has a pH below any of the the first, second or third pka's;
   (b3) a sixth aqueous anionic ink comprising a sixth colorant, a sixth aqueous vehicle and, optionally, a sixth incompatibility additive, said sixth ink having a sixth pKa, provided that, if one or more of inks (a1), (a2) and (a3) is present:
      (i) the sixth pKa is lower than any of the first, second or third pKa's, and
      (ii) the sixth anionic ink has a pH below any of the first, second or third pka's;
   (c1) a first aqueous non-quarternized cationic ink comprising a seventh colorant, a seventh aqueous vehicle and, optionally, a seventh incompatibility additive;
   (c2) a second aqueous non-quarternized cationic ink comprising an eighth colorant, an eighth aqueous vehicle and, optionally, an eighth incompatibility additive;
   (c3) a third aqueous non-quarternized cationic ink comprising a ninth colorant, a ninth aqueous vehicle and, optionally, a ninth incompatibility additive;
   (d1) a first aqueous quarternized cationic ink comprising a tenth colorant, a tenth aqueous vehicle and, optionally, a tenth incompatibility additive;
   (d2) a second aqueous quarternized cationic ink comprising an eleventh colorant, an eleventh aqueous vehicle and, optionally, an eleventh incompatibility additive; and
   (d3) a third aqueous quarternized cationic ink comprising a twelfth colorant, a twelfth aqueous vehicle and, optionally, a twelfth incompatibility additive;
wherein at least one ink from each category (a)–(d) is present in the set, and provided that:
   (a1), (a2) and (a3) are different and, if more than one of (a1), (a2) and (a3) is present, then each of (a1), (a2) and (a3) this is present further comprises, respectively, the first, second and third incompatibility additive, wherein the first, second and third incompatibility additives are incompatible with one another so as to induce aqueous phase separation of the first, second and third aqueous vehicles in the event of contact therebetween;
   (b1), (b2) and (b3) are different and, if more than one of (b1), (b2) and (b3) is present, then each of (b1), (b2) and (b3) that is present further comprises, respectively, the fourth, fifth and sixth incompatibility additive, wherein the fourth, fifth and sixth incompatibility additives are incompatible with one another so as to induce aqueous phase separation of the fourth, fifth and sixth aqueous vehicles in the event of contact therebetween;
   (c1), (c2) and (c3) are different and, if more than one of (c1), (c2) and (c3) is present, then each of (c1), (c2) and (c3) this is present further comprises, respectively, the seventh, eighth and ninth incompatibility additive, wherein the seventh, eighth and ninth incompatibility additives are incompatible with one another so as to induce aqueous phase separation of the seventh, eighth and ninth aqueous vehicles in the event of contact therebetween; and
   (d1), (d2) and (d3) are different and, if more than one of (d1), (d2) and (d3) is present, then each of (d1), (d2) and (d3) that is present further comprises, respectively, the tenth, eleventh and twelfth incompatibility additive, wherein the tenth, eleventh and twelfth incompatibility additives are incompatible with one another so as to induce aqueous phase separation of the tenth, eleventh and twelfth aqueous vehicles in the event of contact therebetween.

8. The ink set of claim 7, wherein no more than two inks from any one category (a)–(d) are present in the set.

9. The ink set of claim 7, wherein all the colorants are pigment.

10. The ink set of claim 7, wherein all the colorants are dye.

11. The ink set of claim 7, wherein the at least four inks are comprised of at least one ink with cyan colorant, at least one ink with magenta colorant, at least one ink with yellow colorant and at least one ink with black colorant.

12. The ink set of claim 7, wherein one of the at least fours inks is comprised of carbon black pigment as the colorant and the remaining inks in the set are comprised of dye as the colorant.

13. A method of inkjet printing comprising the step of printing a substrate with an inkjet printer by jetting an ink set via said inkjet printer onto said substrate, wherein said ink set is an ink set of mutually interactive inks comprising at least four inks selected from categories (a)–(d) as follows:
  (a) aqueous anionic ink with a relative high pKa comprising a colorant and aqueous vehicle;
  (b) aqueous anionic ink with a relative low pKa, comprising a colorant and aqueous vehicle, which is adjusted to a pH below the pKa of any ink in the set from category a;
  (c) aqueous non-quarternized cationic ink comprising colorant and aqueous vehicle and
  (d) aqueous quarternized cationic ink comprising colorant and aqueous vehicle,
wherein at least one ink from each category (a)–(d) is present in the set, no more than three inks from any one category are present in the set, and all inks from any one category further comprise complementary incompatibility ingredients so as to be mutually interacting with one another by an aqueous phase change mechanism.

14. The method of claim 13, wherein said printing is accomplished with a page-wide array.

15. A method of inkjet printing comprising the step of printing a substrate with an inkjet printer by jetting an ink set via said inkjet printer onto said substrate, wherein said ink set is an ink set of mutually interactive inks comprising at least four inks selected from the group consisting of:
  (a1) a first aqueous anionic ink comprising a first colorant, a first aqueous vehicle and, optionally, a first incompatibility additive, said first anionic ink having a first pKa;
  (a2) a second aqueous anionic ink comprising a second colorant, a second aqueous vehicle and, optionally, a second incompatibility additive, said second anionic ink having a second pKa;
  (a3) a third aqueous anionic ink comprising a third colorant, a third aqueous vehicle and, optionally, a third incompatibility additive, said third anionic ink having a third pKa;
  (b1) a fourth aqueous anionic ink comprising a fourth colorant, a fourth aqueous vehicle and, optionally, a fourth incompatibility additive, said fourth anionic ink having a fourth pKa, provided that, if one or more of inks (a1), (a2) and (a3) is present:
    (i) the fourth pKa is lower than any of the first, second or third pKa's, and
    (ii) the fourth anionic ink has a pH below any of the the first, second or third pKa's;
  (b2) a fifth aqueous anionic ink comprising a fifth colorant, a fifth aqueous vehicle and, optionally, a fifth incompatibility additive, said fifth anionic ink having a fifth pKa, provided that, if one or more of inks (a1), (a2) and (a3) is present:
    (i) the fifth pKa is lower than any of the first, second or third pka's, and
    (ii) the fifth anionic ink has a pH below any of the the first, second or third pka's;
  (b3) a sixth aqueous anionic ink comprising a sixth colorant, a sixth aqueous vehicle and, optionally, a sixth incompatibility additive, said sixth ink having a sixth pKa, provided that, if one or more of inks (a1), (a2) and (a3) is present:
    (i) the sixth pKa is lower than any of the first, second or third pka's, and
    (ii) the sixth anionic ink has a pH below any of the first, second or third pKa's;
  (c1) a first aqueous non-quarternized cationic ink comprising a seventh colorant, a seventh aqueous vehicle and, optionally, a seventh incompatibility additive;
  (c2) a second aqueous non-quarternized cationic ink comprising an eighth colorant, an eighth aqueous vehicle and, optionally, an eighth incompatibility additive;
  (c3) a third aqueous non-quarternized cationic ink comprising a ninth colorant, a ninth aqueous vehicle and, optionally, a ninth incompatibility additive;
  (d1) a first aqueous quarternized cationic ink comprising a tenth colorant, a tenth aqueous vehicle and, optionally, a tenth incompatibility additive;
  (d2) a second aqueous quarternized cationic ink comprising an eleventh colorant, an eleventh aqueous vehicle and, optionally, an eleventh incompatibility additive; and
  (d3) a third aqueous quarternized cationic ink comprising a twelfth colorant, a twelfth aqueous vehicle and, optionally, a twelfth incompatibility additive;
wherein at least one ink from each category (a)–(d) is present in the set, and provided that:
  (a1), (a2) and (a3) are different and, if more than one of (a1), (a2) and (a3) is present, then each of (a1), (a2) and (a3) this is present further comprises, respectively, the first, second and third incompatibility additive, wherein the first, second and third incompatibility additives are incompatible with one another so as to induce aqueous phase separation of the first, second and third aqueous vehicles in the event of contact therebetween;
  (b1), (b2) and (b3) are different and, if more than one of (b1), (b2) and (b3) is present, then each of (b1), (b2) and (b3) that is present further comprises, respectively, the fourth, fifth and sixth incompatibility additive, wherein the fourth, fifth and sixth incompatibility additives are incompatible with one another so as to induce aqueous phase separation of the fourth, fifth and sixth aqueous vehicles in the event of contact therebetween;
  (c1), (c2) and (c3) are different and, if more than one of (c1), (c2) and (c3) is present, then each of (c1), (c2) and (c3) this is present further comprises, respectively, the seventh, eighth and ninth incompatibility additive, wherein the seventh, eighth and ninth incompatibility additives are incompatible with one another so as to induce aqueous phase separation of the seventh, eighth and ninth aqueous vehicles in the event of contact therebetween; and
  (d1), (d2) and (d3) are different and, if more than one of (d1), (d2) and (d3) is present, then each of (d1), (d2) and (d3) that is present further comprises, respectively, the tenth, eleventh and twelfth incompatibility additive, wherein the tenth, eleventh and twelfth incompatibility additives are incompatible with one another so as to induce aqueous phase separation of the tenth, eleventh and twelfth aqueous vehicles in the event of contact therebetween.

16. The method of claim 15, wherein said printing is accomplished with a page-wide array.

* * * * *